United States Patent
Hu et al.

(10) Patent No.: US 11,954,218 B2
(45) Date of Patent: Apr. 9, 2024

(54) REAL-TIME ACCESS RULES USING AGGREGATION OF PERIODIC HISTORICAL OUTCOMES

(71) Applicant: Visa International Service Association, San Francisco, CA (US)

(72) Inventors: Hung-Tzaw Hu, Saratoga, CA (US); Haochuan Zhou, Redwood City, CA (US); Ge Wen, Fremont, CA (US); Benjamin Scott Boding, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 501 days.

(21) Appl. No.: 17/170,703

(22) Filed: Feb. 8, 2021

(65) Prior Publication Data
US 2021/0248258 A1    Aug. 12, 2021

Related U.S. Application Data

(60) Provisional application No. 62/972,571, filed on Feb. 10, 2020.

(51) Int. Cl.
*G06F 21/62* (2013.01)
*G06F 9/50* (2006.01)

(52) U.S. Cl.
CPC ........ *G06F 21/6218* (2013.01); *G06F 9/5005* (2013.01)

(58) Field of Classification Search
CPC ........................... G06F 21/6218; G06F 9/5005

USPC ............................................................ 726/1
See application file for complete search history.

(56) References Cited

U.S. PATENT DOCUMENTS

| | | | |
|---|---|---|---|
| 6,697,948 B1 | 2/2004 | Rabin et al. |
| 6,871,287 B1 | 3/2005 | Ellingson |
| 7,263,506 B2 | 8/2007 | Lee et al. |
| 7,458,508 B1 | 12/2008 | Shao et al. |
| 7,984,500 B1 | 7/2011 | Khanna et al. |
| 8,162,125 B1 | 4/2012 | Csulits et al. |

(Continued)

FOREIGN PATENT DOCUMENTS

| | | |
|---|---|---|
| EP | 1939707 | 7/2008 |
| WO | 2008141168 | 11/2008 |
| WO | 2009137716 | 11/2009 |

OTHER PUBLICATIONS

Application No. EP18741917.1, Summons to Attend Oral Proceedings, Mailed On Feb. 20, 2023, 13 pages.

(Continued)

*Primary Examiner* — Dereena T Cattungal
(74) *Attorney, Agent, or Firm* — Kilpatrick Townsend & Stockton LLP

(57) ABSTRACT

Embodiments of the present disclosure provide systems, methods, and apparatuses for addressing the above problems through the use of access rules that involve analyzing historical access request result data for various data elements individually and in combination over a predefined time interval. An automated determination can be made for whether a transaction can be authenticated based upon the historical access request result data (e.g., ultimately, deciding whether the data element or set of data elements are associated with a valid access request).

20 Claims, 7 Drawing Sheets

(56) References Cited

U.S. PATENT DOCUMENTS

| | | | |
|---|---|---|---|
| 8,682,696 | B1 | 3/2014 | Shanmugam |
| 9,813,402 | B1 | 11/2017 | Chen et al. |
| 2006/0265599 | A1 | 11/2006 | Kanai |
| 2007/0038560 | A1 | 2/2007 | Ansley |
| 2007/0240203 | A1 | 10/2007 | Beck |
| 2009/0044279 | A1 | 2/2009 | Crawford et al. |
| 2009/0061831 | A1 | 3/2009 | Shastry |
| 2009/0157516 | A1 | 6/2009 | Babu et al. |
| 2009/0161152 | A1 | 6/2009 | Mori |
| 2010/0138243 | A1 | 6/2010 | Carroll |
| 2010/0332475 | A1 | 12/2010 | Birdwell et al. |
| 2011/0010761 | A1* | 1/2011 | Doyle ............... G06F 21/6218 726/5 |
| 2011/0016050 | A1 | 1/2011 | Evans |
| 2011/0047608 | A1* | 2/2011 | Levenberg ......... H04L 63/0807 726/7 |
| 2011/0208864 | A1 | 8/2011 | St. Laurent et al. |
| 2011/0218877 | A1 | 9/2011 | Barber |
| 2011/0251951 | A1 | 10/2011 | Kolkowitz et al. |
| 2011/0282778 | A1 | 11/2011 | Wright et al. |
| 2012/0158585 | A1 | 6/2012 | Ganti |
| 2012/0278335 | A1 | 11/2012 | Bentkofsky et al. |
| 2013/0110722 | A1 | 5/2013 | Boding |
| 2013/0324086 | A1 | 12/2013 | Celi et al. |
| 2015/0142733 | A1 | 5/2015 | Shadmon |
| 2015/0206146 | A1 | 7/2015 | Siddens |
| 2016/0203489 | A1 | 7/2016 | Wang et al. |
| 2016/0366164 | A1 | 12/2016 | Cohen et al. |
| 2018/0288063 | A1* | 10/2018 | Koottayi ............... G06F 21/50 |
| 2018/0337927 | A1* | 11/2018 | Carnahan ............... H04L 63/10 |
| 2018/0357105 | A1* | 12/2018 | Rishabh .............. G06F 21/6218 |
| 2019/0319987 | A1* | 10/2019 | Levy .................. H04L 9/3265 |
| 2020/0053088 | A1* | 2/2020 | Drake, II ............. H04L 63/08 |
| 2020/0053090 | A1* | 2/2020 | Kliger ................... G06F 18/214 |

OTHER PUBLICATIONS

Threat Metrix, "How Device Identification Defeats Online Fraud Whitepaper" https:/www.pymnts.com/assets/Uploads/categories/How-Device-ID-Defeats-Online-Fraud.pdf; and http://www.cse.iiid.emet.in/~siy117527/sil765/readings/Device-Fingerprinting-and-Online-Fraud-Protection-Whitepaper.pdf. 11 pages.

Carminati, et al, FraudBuster: Temporal Analysis and Detection of Advanced Financial Frauds, https://re.public.polimi.it/retrieve/handle/11311/1057195/486528/paper.pdf, 22 pages.

"Clearly and Simply : Intelligent Data Analysis, Modeling, Simulation and Visualization", Build Network Graphs in Tableau, Available online at : http:/www .cleariyandsimply.com/dearly_and_simply/2012/12/bu i !d networkgraphs-in-ta.b!emi.html, Dec. 11, 2012, 19 pages.

"Use Linkurious to Fight Fraud", Slogs posts, Available online at : http:/ /l in ku rio. us/use-i in ku rio us-fight-fraud, Apr.-Aug. 2014, 7 pages.

U.S. Appl. No. 15/408,236 , Final Office Action, dated Aug. 21, 2019, 27 pages.

U.S. Appl. No. 15/408,236 , Final Office Action, dated Jan. 1, 2021, 35 pages.

U.S. Appl. No. 15/408,236 , Non-Final Office Action, dated Apr. 26, 2019, 27 pages.

U.S. Appl. No. 15/408,236 , Non-Final Office Action, dated Sep. 2, 2020, 34 pages.

Application No. EP18741917.1 , Extended European Search Report, dated Oct. 24, 2019, 11 pages.

Lanum , "Combating Fraud Using Graph Databases and Graph Visualization", Cambridge Intelligence, Available online at : http:vimeo.cmn/64827612, Apr. 25, 2013, 2 pages.

Oughton , "Force Directed Emails Visualization Using arbor.js", Available online at :http:joeloughto11 ,com/blog/web-applications/force-dirnctedemailsvisualisation-using-arbor-js/, May 4, 2011, 4 pages.

Application No. PCT/US2018/013403 , International Preliminary Report on Patentability, dated Aug. 1, 2019, 8 pages.

Application No. PCT/US2018/013403 , International Search Report and Written Opinion, dated Apr. 30, 2018, 12 pages.

Quah et al., "Real Time Credit Card Fraud Detection Using Computational Intelligence", Proceedings of International Joint Conference on Neural Networks, vol. 35, No. 4, Aug. 1, 2007, pp. 1721-1732.

Application No. EP18741917.1 , Office Action, dated Jul. 18, 2023, 4 pages.

* cited by examiner

REAL-TIME ACCESS RULES USING AGGREGATION OF PERIODIC HISTORICAL OUTCOMES

CROSS-REFERENCES TO RELATED APPLICATIONS

The present application claims priority from and is a non-provisional application of U.S. Provisional Application No. 62/972,571, entitled "Real-Time Access Rules Using Aggregation Of Periodic Historical Outcomes" filed Feb. 10, 2020, the entire contents of which are herein incorporated by reference for all purposes.

BACKGROUND

An unauthorized user may fraudulently request access to a resource using some information of an authorized user. To prevent unauthorized access, a resource security system may implement access rules to reject access requests having certain parameters that are indicative of a fraudulent attack. Generally, detection mechanisms are based on analysis of individual data elements of authentication requests, such as a name, secret identifier (e.g., as password), and device fingerprint. Conventional detection methods analyze these individual data elements to determine if new requests match an authorized user or compare data elements of a possible intruder to a blacklist.

Furthermore, typical fraud detection systems may not be accurate and sometimes mistakenly approve fraudulent access requests. In some cases where a fraudulent access request is approved, the user often may not detect the improper access for a period of time. During the resulting period of "infected time", both the user and a fraudster may initiate access requests as the fraud detection systems are not able to differentiate between the user and the fraudster. Therefore, the user does not realize their information has been compromised, enabling unauthorized access to a resource for at least the period of time before the user notices the fraudulent activity.

Accordingly, there is a need for a detection mechanism that more accurately discriminates between fraudulent access requests and legitimate access requests during and after an attack on a resource involved in communications of access requests among networked devices.

BRIEF SUMMARY

Embodiments of the present disclosure provide systems, methods, and apparatuses for addressing the above problems through the use of access rules that involve analyzing an aggregation of historical access result values for various data elements over a time interval. A computer-implemented determination can be made for whether an access request can be authenticated based upon the aggregation of the historical access result values (e.g., ultimately, deciding whether a data element or set of data elements are associated with a valid access request).

The historical access results can be processed and stored in such a manner to allow efficient retrieval from memory, thereby allowing a faster response to the access request. Vectors of the historical access results can be stored for various detector values corresponding to data elements used in the historical access requests. A classification of an access request, which is determined using the vectors, can be used in combination with an access rule to determine whether to provide access to a resource (e.g., a computer). The use of access rules and the detectors can enable a uniform and efficient procedure for detecting malicious activity. Furthermore, the use of historical access result data for determining an access rule can allow a higher level of accuracy and precision in determining the validity of an access request, wherein the data element or set of data elements associated with the access request can be analyzed based upon at least one or more historical access request results.

Some embodiments of the present disclosure include a computer-implemented method that stores a vector of historical access result values corresponding to periodic time intervals within a historical time period for each of a plurality of detector values of each of a set of detectors. Each detector of the set of detectors can include one or more data elements used in historical access requests to a set of one or more resources including the resource. The historical access result values can provide a measure of approval in granting access to historical access requests for a corresponding detector during a time interval.

An access rule including one or more conditions can be stored. The access rule and the vectors of historical access result values can be loaded into a system memory. A plurality of real-time access requests can be received over a network from a plurality of devices. The system memory can be accessed to obtain the access rule when a real-time access request of the plurality of real-time access requests is received from a first device of the plurality of devices. The real-time access request can comprise a plurality of current data elements corresponding to at least a portion of the set of detectors.

The plurality of current data elements can be extracted from the real-time access request and matched to at least a portion of the set of detectors to form a subset of detectors. The vectors of historical access result values can accessed for the subset of detectors. The historical access result values can be aggregated for each of the subset of detectors to obtain a detector value, which can provide a measure of approval in granting access to historical access requests for the detector. Using the detector values of the subset of detectors, a classification of the real-time access request can be generated. The access rule can be used to determine an access request outcome for the real-time access request, such that one or more conditions of the access rule includes the classification. Access can be provided to the resource based on the access request outcome.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

TERMS

Figure 1:
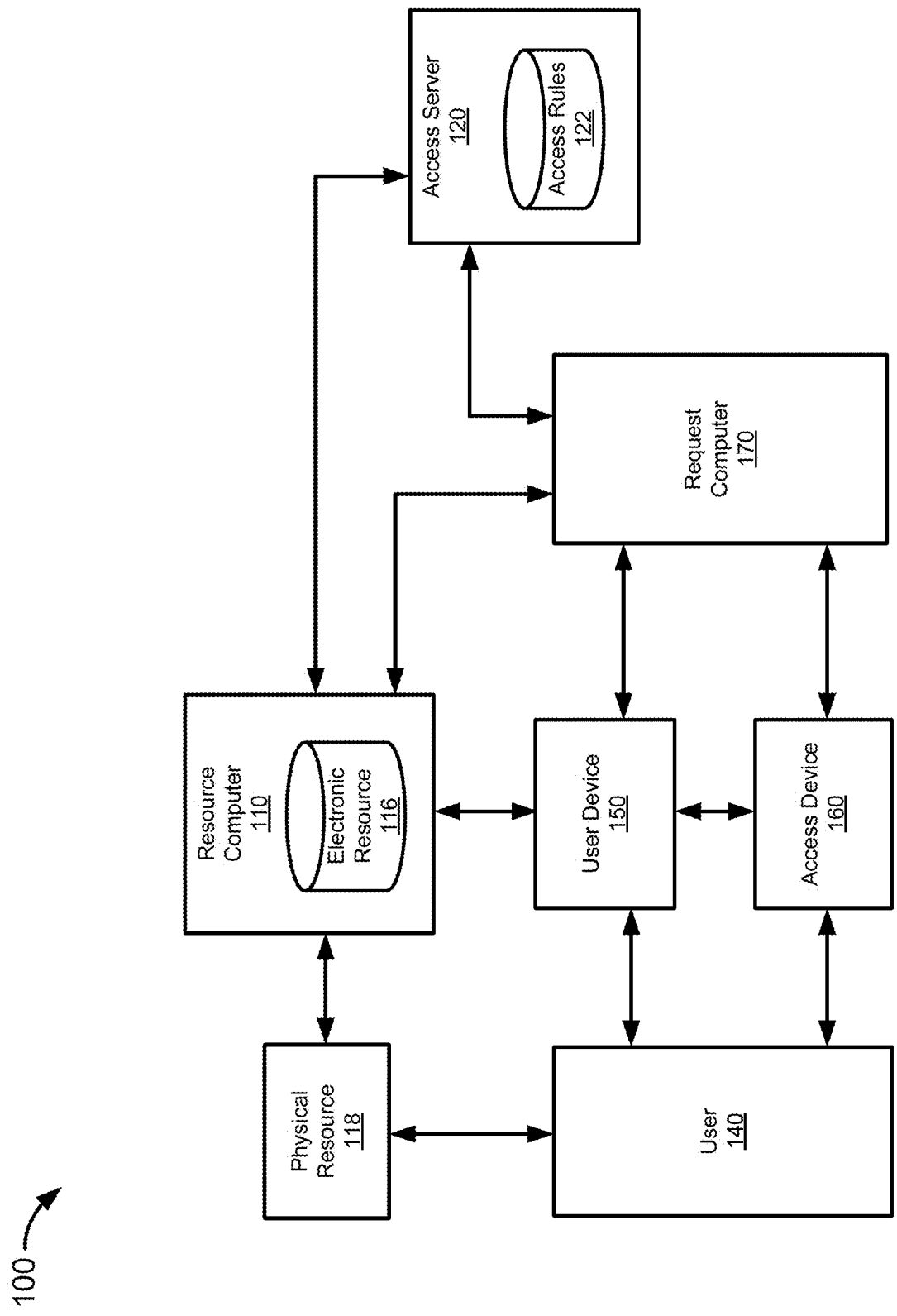
FIG. 1 shows a resource security system for authorizing access to resources, in accordance with some embodiments of the present invention.

Prior to discussing embodiments of the disclosure, description of some terms may be helpful in understanding embodiments of the disclosure.

The term "resource" generally refers to any asset that may be used or consumed. For example, the resource may be an electronic resource (e.g., stored data, received data, a computer account, a network-based account, an email inbox), a physical resource (e.g., a tangible object, a building, a safe, or a physical location), or other electronic communications between computers (e.g., a communication signal corresponding to an account for performing a transaction). Thus, a physical resource can be a physical object.

The term "access request" (also referred to as an "authentication request") generally refers to a request to access a resource. The access request may be received from a requesting computer, a user device, or a resource computer, for example. The access request may include authentication information (also referred to as authorization information), such as a user name, resource identifier, or password. The access request may also include and access request parameters, such as an access request identifier, a resource identifier, a timestamp, a date, a device or computer identifier, a geo-location, or any other suitable information. A real-time access request occurs when access to a resource is desired at the time the request is made. In such situations, it is desirable to provide a quick determination for whether to provide access to the resource.

The term "access result" generally refers to an outcome of an access request. The access result may be received from a resource computer or an access server. The access result may include all of the elements of the access request. For example, the access result may include authentication information (also referred to as authorization information), such as a user name, resource identifier, or password. The access result may also include access request parameters, such as an access request identifier, a resource identifier, a timestamp, a date, a device or computer identifier, a geo-location, or any other suitable information. In addition, the access result may include an evaluation score, or any suitable means of determination, for whether the access request was accepted (e.g., indicated by a positive evaluation score) or denied (e.g., indicated by a negative evaluation score). For example, if the access result includes a positive evaluation score or determination, the user is granted access to the resource. Similarly, if the access result includes a negative evaluation score or determination, the resource computer denies access to the resource.

The term "access result values" generally refers to possible outcomes of an access request, e.g., acceptances, rejections, fraud, and review. The set of outcomes determine whether or not access to the resource was granted to a user. The access result values can be counted to provide a set of counts of access results. As examples, the access result values can comprise a count for accepted access results, a count for rejected access results, a count for fraudulent access results, and a count for access results that need to be reviewed. The access result values may be included within historical access result data and used by a detector to generate a measure of approval for an access request.

The term "detector" generally refers to any suitable structure or element that can evaluate a data element or a combination of data elements extracted from an access request. An evaluated data element may comprise a user name, an email, an account number, a password, etc. For a detector that evaluates a combination of data elements, exemplary combinations of data elements may include the user name and the email; the email and the account number; or the user name, the email, and the account number. A set of detectors is typically used to generate a score measuring the legitimacy of an access request based upon historical access result data.

The term "historical access result data" generally refers to a collection of access results associated with a detector. Historical access result data may include all of the elements of each of the access results, such as authentication information (e.g., a user name, resource identifier, or password) and access request parameters (e.g., access request identifier, a resource identifier, a timestamp, a date, a device or computer identifier, a geo-location, or any other suitable information). Furthermore, the historical access result data may comprise information (e.g., an evaluation score) about whether or not a past access result was accepted or rejected. In some embodiments, the historical access result data may only comprise a set of access results for a predetermined time period. A set of access results may also further be compartmentalized into shorter time windows within the predetermined time period.

The term "access rule" may include any procedure or definition used to determine an access rule outcome for an access request based on certain criteria. In some embodiments, the rule may comprise one or more rule conditions and an associated rule outcome. A "rule condition" may specify a logical expression describing the circumstances under which the outcome is determined for the rule. A condition of the access rule may involve authentication information, as well as request parameters. For example, the authentication information can be required to sufficiently correspond to information categorized as legitimate, e.g., based on a match to critical nodes of a data structure and/or to a sufficient number of nodes. A condition can require a specific parameter value, a parameter value to be within a certain range, a parameter value being above or below a threshold, or any combination thereof.

The terms "binding" or "connection" can refer to two data elements being bound if (and potentially only if) the two data elements are included in one access request together. The binding can be extended to more than two data elements scenarios. All data elements in one request can be bound together. A "cluster" of data elements (nodes) can refer to a collection of overlapped bindings or that overlap on certain data elements.

The term "server computer" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers. The term "computer system" may generally refer to a system including one or more server computers coupled to one or more databases.

DETAILED DESCRIPTION

Embodiments of the invention can provide a data structure that stores historical access result data in order to determine the legitimacy of a user that is requesting access to one or more resources that are being protected by a resource security system. The data structure can be stored in such a manner to provide efficient computer retrieval and analysis to provide an electronic response regarding access to a resource. Historical access result values for various data elements can be aggregated over a time interval. A computer-implemented determination can be made for whether an access request can be authenticated based upon the aggregation of the historical access result values (e.g., ultimately, deciding whether a data element or set of data elements are associated with a valid access request).

The historical access results can be processed and stored in such a manner to allow efficient retrieval from memory, thereby allowing a faster response to the access request. Vectors of the historical access results can be stored for various detector values corresponding to data elements used in the historical access requests. A classification of an access request, which is determined using the vectors, can be used in combination with an access rule to determine whether to provide access to a resource (e.g., a computer). The use of access rules and the detectors can enable a uniform and efficient procedure for detecting malicious activity. Furthermore, the use of historical access result data for determining an access rule can allow a higher level of accuracy and precision in determining the validity of an access request, wherein the data element or set of data elements associated with the access request can be analyzed based upon at least one or more historical access request results.

Authentication using a resource security system is first discussed, followed by a description of the evaluation of historical access result data for accessing the protected resource.

I. Authentication for Accessing a Protected Resource

Generally, access requests for a computer resource or account (e.g., transactions over the Internet) go through a fraud detection system to determine whether the transaction is authorized or rejected as being fraudulent. Thus, a resource security system may receive requests to access a resource. The resource security system may include an access server for determining an outcome for the access request based on access rules. An exemplary resource security system is described in further detail below.

FIG. 1 shows a resource security system 100 for authorizing access to resources, in accordance with some embodiments. The resource security system 100 may be used to provide authorized users (e.g., via authentication) access to a resource while denying access to unauthorized users. In addition, the resource security system 100 may be used to deny fraudulent access requests that appear to be legitimate access requests of authorized users. The resource security system 100 may implement access rules to identify fraudulent access requests based on parameters of the access request. Such parameter may correspond to fields (nodes) of a data structure that is used to distinguish fraudulent access requests from authentic access requests.

The resource security system 100 includes a resource computer 110. The resource computer 110 may control access to a physical resource 118, such as a building or a lockbox, or an electronic resource 116, such as a local computer account, digital files or documents, a network database, an email inbox, a payment account, or a website login. In some embodiments, the resource computer may be a webserver, an email server, or a server of an account issuer. The resource computer 110 may receive an access request from a user 140 via a user device 150 (e.g., a computer or a mobile phone) of the user 140. The resource computer 110 may also receive the access request from the user 140 via a request computer 170 coupled with an access device 160 (e.g., a keypad or a terminal). In some embodiments, the request computer 170 may be a resource provider. For example, the request computer 170 and the resource computer 110 may be the same, wherein the access request from the user 140 is generated directly at the resource computer 110.

The access device 160 and the user device 150 may include a user input interface such as a keypad, a keyboard, a finger print reader, a retina scanner, any other type of biometric reader, a magnetic stripe reader, a chip card reader, a radio frequency identification reader, or a wireless or contactless communication interface, for example. The user 140 may input authentication information into the access device 160 or the user device 150 to access the resource. Authentication information may also be provided by the access device 160 and/or the user device 150. The authentication information may include, for example, one or more data elements of a user name, an account number, a token, a password, a personal identification number, a signature, a digital certificate, an email address, a phone number, a physical address, and a network address. The data elements may be labeled as corresponding to a particular field, e.g., that a particular data element is an email address. In response to receiving authentication information input by the user 140, the user device 150 or the request computer 170 may send an access request, including authentication information, to the resource computer 110 along with one or more parameters of the access request.

In one example, the user 140 may enter one or more of an account number, a personal identification number, and password into the access device 160, to request access to a physical resource (e.g., to open a locked security door in order to access a building or a lockbox) and the request computer 170 may generate and send an access request to the resource computer 110 to request access to the resource. In another example, the user 140 may operate the user device 150 to request that the resource computer 110 provide access to the electronic resource 116 (e.g., a website or a file) that is hosted by the resource computer 110. In another example, the user device 150 may send an access request (e.g., an email) to the resource computer 110 (e.g., an email server) in order to provide data to the electronic resource 116 (e.g., deliver the email to an inbox). In another example, the user 140 may provide an account number and/or a personal identification number to an access device 160 in order to request access to a resource (e.g., a payment account) for conducting a transaction.

In some embodiments, the resource computer 110 may verify the authentication information of the access request based on information stored at the request computer 170. In other embodiments, the request computer 170 may verify the authentication information of the access request based on information stored at the resource computer 110.

The resource computer 110 may receive the request substantially in real-time (e.g., account for delays computer processing and electronic communication). Once the access request is received, the resource computer 110 may determine parameters of the access request. In some embodiments, the parameters may be provided by the user device 150 or the request computer 170. For example, the parameters may include one or more of: a time that the access request was received, a day of the week that the access request was received, the source-location of the access request, the amount of resources requested, an identifier of the resource being request, an identifier of the user 140, the access device 160, the user device 150, the request computer 170, a location of the user 140, the access device 160, the user device 150, the request computer 170, an indication of when, where, or how the access request is received by the resource computer 110, an indication of when, where, or how the access request is sent by the user 140 or the user device 150, an indication of the requested use of the electronic resource 116 or the physical resource 118, and an indication of the type, status, amount, or form of the resource being requested. In other embodiments, the request computer 170 or the access server 120 may determine the parameters of the access request.

The resource computer 110 or the request computer 170 may send the parameters of the access request to the access server 120 in order to determine whether the access request is fraudulent. The access server 120 may store one or more access rules 122 for identifying a fraudulent access request. Each of the access rules 122 may include one or more conditions corresponding to one or more parameters of the access request. The access server 120 may determine an access request outcome indicating whether the access request should be accepted (e.g., access to the resource granted), rejected (e.g., access to the resource denied), or reviewed by comparing the access rules 122 to the parameters of the access request as further described below. In some embodiments, instead of determining an access request outcome, the access server 120 may determine an evaluation score based on outcomes of the access rules. The evaluation score may indicate the risk or likelihood of the access require being fraudulent. If the evaluation score indicates that the access request is likely to be fraudulent, then the access server 120 may reject the access request.

The access server 120 may send the indication of the access request outcome to the resource computer 110 (e.g., accept, reject, review, accept and review, or reject and review). In some embodiments, the access server 120 may send the evaluation score to the resource computer 110 instead. The resource computer 110 may then grant or deny access to the resource based on the indication of the access request outcome or based on the evaluation score. The resource computer 110 may also initiate a review process for the access request.

In some embodiments, the access server 120 may be remotely accessed by an administrator for configuration. The access server 120 may store data in a secure environment and implement user privileges and user role management for accessing different types of stored data. For example, user privileges may be set to enable users to perform one or more of the following operations: view logs of received access request, view logs of access request outcomes, enable or disable the execution of the access rules 122, update or modify the access rules 122, change certain access request outcomes. Different privileges may be set for different users.

The resource computer 110 may store access request information for each access requests that it receives. The access request information may include authentication information and/or the parameters of each of the access requests. The access request information may also include an indication of the access request outcome for the access request, e.g., whether access request was actually fraudulent or not. The resource computer 110 may also store validity information corresponding to each access request. The validity information for an access request may be initially based on its access request outcome. The validity information may be updated based on whether the access request is reported to be fraudulent. In some embodiments, the access server 120 or the request computer 170 may store the access request information and the validity information.

II. Data Elements as Detectors

Embodiments of the disclosure can use one or more detectors in determining the validity of one or more data elements (e.g., extracted from user inputted authentication information) related to an access request. The validity of a data element can be used to determine a validity of an access request including the data element. The contributions of data elements (negatively or positively) toward validity or suggesting an attacker can be used to make a final determination for whether to authenticate an access request as part of providing access to the resource based on the access request outcome.

A detector can provide a validity contribution using historical access requests and the corresponding results that included the data element(s) of that detector. In this manner, a detector can extract the data element(s) assigned to that detector from an access request. For example, a particular detector can be assigned to the email in the access request. The detector can then use historical access requests that included the given email of an access request to determine a validity contribution, where such historical access requests can be for a particular resource or across a set of resources. The more valid results from the historical access requests generally provides a more positive validity contribution. The more invalid results (e.g., identified as an attacker, usually after the fact), the more negative the validity contribution would be. Various types of historical access result values can affect the validity contribution in different ways, e.g., with different result values having different weights.

An individual detector may be configured to evaluate a single data element (e.g., an account number). Another detector may further be configured to evaluate a combination of at least two or more data elements (e.g., an account number and an email). In some embodiments, a set of detectors is defined, wherein at least a subset of the detectors validate a single data element and another subset of the detectors validate combinations of two or more data elements. A data element may be evaluated individually and in combination with other data elements by more than one detector. For example, a set of detectors may include (but is not limited to) a detector for an account number and another detector for an account number and an email.

Each of the set of detectors may retrieve a vector of historical access result data associated with its corresponding one or more data elements for a period of time (e.g., one or more years). The vector may be retrieved from a data structure stored within a database. The vector of historical access result data can comprise a set of counts for past access results associated with the corresponding one or more data elements. That is, different types of access results (e.g., accept, reject, fraud, and review) can each have their own count. Further, different subtypes can have their own count, e.g., different types of acceptances can contribute different amounts to an overall acceptance count.

For instance, the set of counts can include a count of accepted access requests and rejected access requests. For example, a detector for a user email may retrieve a vector that includes the number of times that access requests associated with the user email have been accepted or rejected. The set of counts may further specify a count of access requests for which a determination could not be made and a count of access requests that were initially accepted but later determined to be fraudulent.

In some embodiments, the historical access result data may be further differentiated into a set of predetermined time intervals (e.g., weekly or monthly) over the period of time. Furthermore, each vector of historical access result data can be identified by a resource identifier, such that when retrieving the vector, the resource identifier associated with the vector is compared to the resource identifier provided within the access request. In other implementations, the vector of historical access result data can be an aggregate for all resources, and thus agnostic to the particular resource identified in a current access request.

After retrieving the vector of historical access result data for each of the set of detectors, a detector value for each detector can be generated based upon the retrieved vector of historical access result data. Each detector value may predict a probability or likelihood that the corresponding one or more data elements are valid and not associated with a malicious access request, e.g., as a validity contribution. A vector of detector values is generated, where each of the detector values is generated from one of the set of detectors. The vector of detector values can be aggregated into an evaluation score, wherein the evaluation score determine either a positive classification or a negative classification for the access request. In some embodiments, at least one of the conditions for an access rule defined by the access server for authenticating an access request is based upon the determined classification. For example, an access rule may include a condition to reject any access request that has been given a negative classification or a certain level of a negative classification, e.g., for a highly negative classification.

The set of detectors may further be categorized into single provider detectors and cross provider detectors. A single provider detector is used with a distribution determined for only a particular resource provider (or request computer) associated with the current access request in order to provide a first classification. A cross provider detector can be used in combination with a distribution determined across multiple resource providers in order to provide a second classification. Therefore, an access request may be given a first classification based upon a set of single provider detectors and a second classification based upon a set of cross provider detectors. In some instances, the first and second classifications for the current access request may not be the same.

III. Binding of Data Elements

A new user may be initialized into the system in various ways, e.g., via an enrollment where the user enters specific information or via a passive operation that uses information in access requests. At the time of an access request, the new user may provide at least one or more data elements that can be used to identify the user. The one or more data elements may include an email, an address, an account number, etc. At least one of the data elements may further be used as a resource identifier that identifies a resource to which the user is requesting access. In some embodiments, an account number may be used as the resource identifier.

The system may search for a record associated with the resource identifier or additional one or more data elements provided by the user within the access server. If no matching record is located within the access server, the system can generate a new record profile for the user, wherein the new record profile includes the resource identifier and the additional one or more data elements. In some embodiments, the user may also provide a set of historical access result data to additionally associate with the new record profile in order to aid the system in making accurate predictions based upon previous access results associated with the user or the one or more data elements. In some embodiments, the new record profile may be a data structure.

Figure 2:
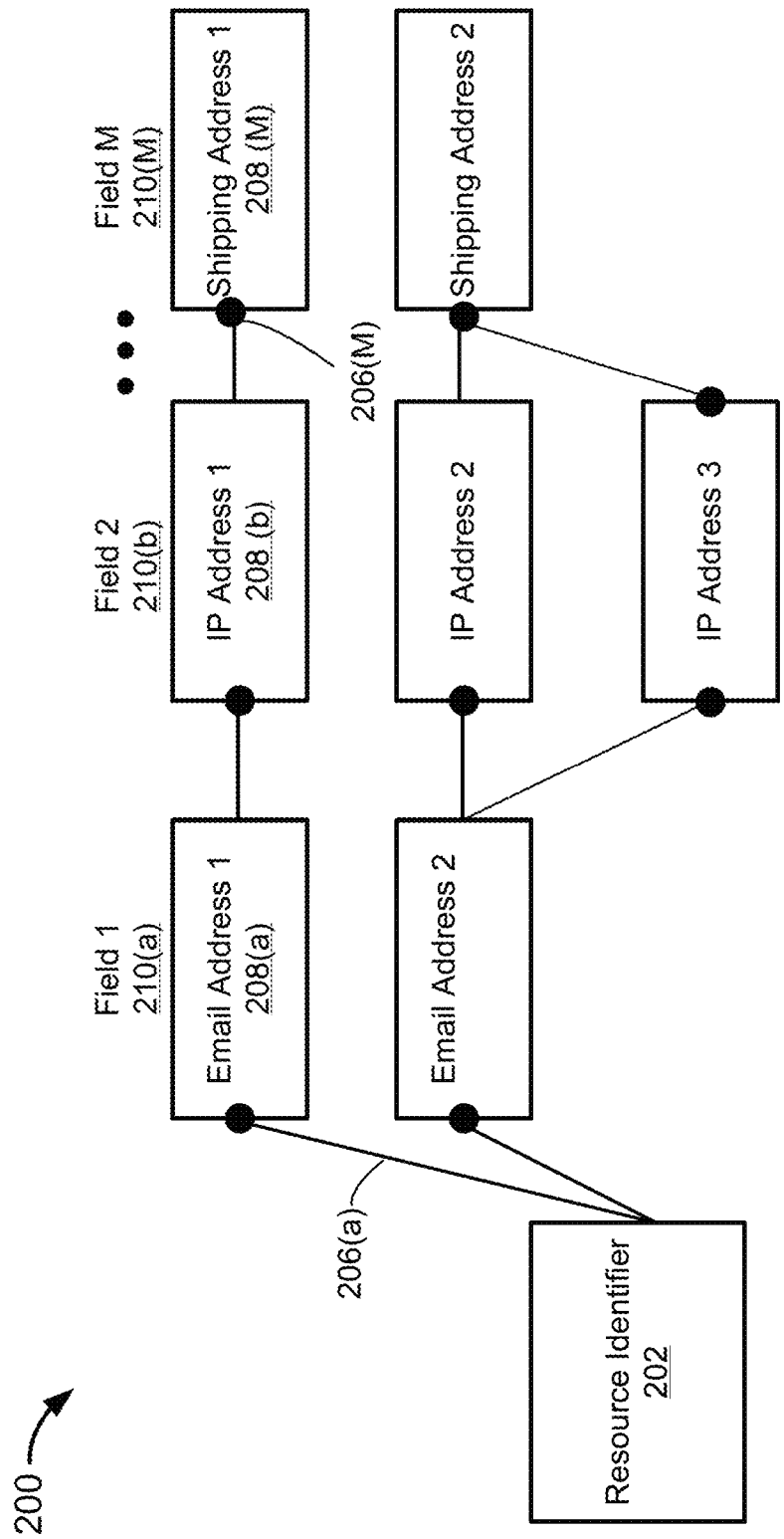
FIG. 2 shows an exemplary data structure for the storage of historical access result data, in accordance with some embodiments of the present invention.

FIG. 2 shows an exemplary data structure 200 for the storage of historical access result data, in accordance with some embodiments of the present invention. In this example, the data structure 200 includes a resource identifier 202 and a set of fields 210(*a*)-210(M) for storage of the one or more data elements 208(*a*)-208(M). In such embodiments, each field may store a single data element. Each field may also include historical access result data for the single data element, such that the historical access result data indicates at least a count of accepted access results and a count of rejected access results for the single data element.

A subset of fields 210(*a*)-210(M) may include a binding or connection in order to form a cluster of data elements that can be associated with a past access request. The data structure can have M fields and M connections between the M fields. In one example, if a user email 208(*a*), an IP address 208(*b*), and a shipping address 208(M) are all typically provided by a user for at least a subset of access requests, a cluster comprising the user email 208(*a*), the IP address 208(*b*), and the shipping address 208(M) is generated, such that each of the data elements of the cluster are connected by connections 206(*a*)-206(M). Similarly, if a user email 2, an IP address 2, and a shipping address 2 are typically used together within another subset of access requests, another cluster comprising the user email 2, the IP address 2, and the shipping address 2 may be generated. In some embodiments, if another subset of access requests typically comprise a user email 2, a shipping address 2, and either an IP address 2 and an IP address 3 (e.g., wherein a user may alternate between the two IP addresses), another cluster comprising the user email 2, the shipping address 2, the IP address 2 and the IP address 3 may be generated. In such an instance, two or more data elements of the same field (e.g., IP address) may be included within a single cluster due to each of the two or more data elements having an equal (e.g., or at least close to equal) association with one or more other data elements within a subset of access requests.

A new record profile may be stored in a database stored within the access server. For future access requests, the new record profile can be identified by the resource identifier 202 that had initially been provided by the user. The user may opt to associate one or more additional data elements with the new record profile after enrollment. For example, a new user may initially only provide an email address 208(*a*) within an access request for a resource. The new user may then be prompted (e.g., by an access server computer or a resource/request computer) to provide another data element (e.g., an account number, an address, or a fingerprint). Each of the provided additional one or more data elements can be included within a new field of the data structure 200 for the new record profile.

When a same user continues to use the same data elements in valid access requests, the data structure 200 has fewer nodes, and the counts of valid access requests including a particular data element increases. As described above, each of the data elements or various collections of data elements can be used in detectors. Such a technique can allow data across users and resources to be leveraged to determine validity for a given access request. Thus, the historical access requests can be received for a plurality of users for a plurality of resources. And, the individual vectors of historical access results for a detector can be stored in a manner that allows quick access to the historical data used to make the assessment of the validity contribution. For example, each detector can have its own data structure stored as a vector of historical access results.

IV. Historical Tracking and Time-Based Data Structures

Embodiments of the disclosure can aggregate historical access result data within the data structure in order to generate predictions for the validity of access requests.

In other embodiments, a data structure does not need to include a resource identifier and separate data structures can be stored for individual detectors. In this manner, each detector can be evaluated independently, thereby allowing parallelization and quick retrieval, as limited to no parsing of a data structure is required, since the data structure only includes data for the particular detector.

A. Counts of Access Results

Figure 3:
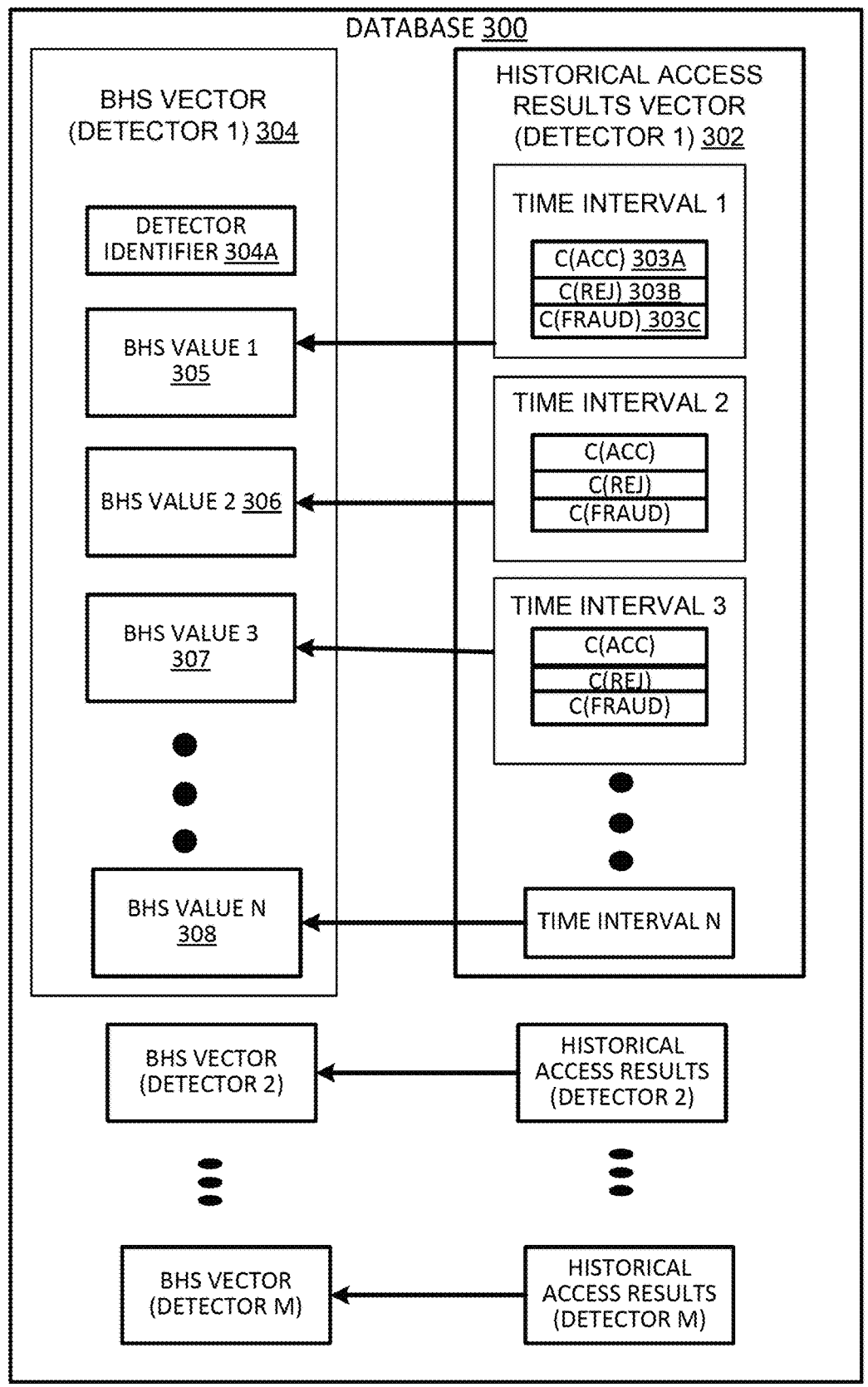
FIG. 3 shows a block diagram of an exemplary database for the storage of historical access result data vectors and binding history summary values, in accordance with some embodiments of the present invention.

FIG. 3 shows a block diagram of an exemplary database 300 for the storage of historical access results vectors and binding history summary (BHS) values, in accordance with some embodiments of the present invention. Database 300 stores data for each of a set of detectors. As example above, the detectors can correspond to just one data element or to a binding of a combination of data elements. The term binding refers to the data element(s) being analyzed together. The detector data can include historical access results, e.g., weighted scores for acceptances, rejections, fraud, reviews, etc. Such historical access results can be stored for time intervals (e.g., days, weeks, etc.) going back for a certain time period (e.g., a year). And, summary values (e.g., a weighted sum or other functional value) can be determined for each time interval. Such summary values can be precomputed for greater efficiency when an access request needs to be evaluated in real-time.

Historical access results vector 302 corresponds to detector 1. Other historical access results vectors are shown for the N detectors in a set of detectors that are used to evaluate the validity of an access request based on the data elements in the access request. Other sets of detectors can be used, each providing an evaluation score for validity. For example, one set can correspond to statistical tracking across resource (or request) computers and another set can correspond to statistical tracking for just one resource (or request) computer.

For a single detector (e.g., detector 1), access results can be tracked over a time interval (e.g., time interval 1) in order to determine a count of a type of access result (e.g., a count of acceptances, a count of rejections, and a count of fraud). An approved access result indicates a successful access request, such that the access request was authorized and a user is granted access to a resource (e.g., in the example of a payment transaction, an acquirer associated with a merchant is able to capture funds for completion of the transaction from an issuing bank). A rejected access result indicates an unsuccessful access request due to any number of potential reasons. For example, in the case of a payment transaction, an access request (e.g., for completing the payment transaction) may be denied due to the use of invalid payment credentials. A fraudulent access request indicates an access request where the initial acceptance is revoked due to a resource provider determining (at a later point) that an unauthorized user was granted access to the resource.

Referring to FIG. 3, detector 1 can retrieve all historical access result data corresponding to its one or more data elements over the time interval 1 from a data structure within an access server. The data structure may be mapped to a resource identifier within another database within the access server, wherein the resource identifier is also included within the current access request.

The retrieved historical access result data for detector 1 is stored within the historical access results vector 302, wherein the historical access results vector 302 comprises a set of counts for a set of time intervals. The counts may be categorized by an access result type. For example, all instances of an approved access result over the time interval 1 may be counted as an acceptance count 303A. All instances of a rejected access result over the time interval 1 may be counted as a rejection count 303B. Instances of a fraudulent access result over the time interval may be counted as a fraudulent count 303C.

The time interval 1 typically corresponds to only a subset of a total period of time for which the database 300 has stored historical access result data. For example, detector 1 may also calculate counts of access result types for a time interval 2 to a time interval N, where a sum of all of the time intervals (e.g., from 1 to N) is equivalent to the total period of time. In addition, the counts may vary for each time interval over the total period of time.

The historical access results vector 302 may be structured so that each row comprises a set of counts for the single detector that correspond to an individual time interval. The columns of the vector can be directed to a set of time intervals, such that the entire set of time intervals comprises a complete subset of the total period of time. For example, a detector A may have access to vectors of historical access result data that comprises a set of counts for the time interval 1 to the time interval N.

For embodiments of the disclosure where more than one detector is used, a separate vector of the historical access result data is generated for each separate detector, where a total of M vectors of the historical access result data are generated for M detectors.

B. Binding Historical Summary Values

Referring again to FIG. 3, the historical access results vector 302 for detector 1 is used to generate a binding historical summary (BHS) vector 304 for the detector 1. The BHS vector 304 comprises a detector identifier 304A and a set of BHS values 305-308. The detector identifier 304A can identify that the BHS vector 304 is associated with the detector 1. The historical access results vector 302 may also include a detector identifier associated with the detector 1 that can be used to determine a match between the historical access results vector 302 and the BHS vector 304. In response to a positive match, the historical access results vector 302 may transmit the set of counts for each of the time intervals to the BHS vector 304. Each of the set of counts may also include a time interval identifier, wherein the time interval identifier specifies to which time interval each of the set of counts corresponds.

Each of the set of BHS values can be a validity contribution for each of the time intervals. For example, the counts 303A-303C for a time interval 1 may be used to generate a BHS value 1. Similarly, the counts for a time interval 2 may be used to generate a BHS value 2. A BHS value may be generated for each of the N time intervals associated with detector 1 such that a total of N BHS values are generated.

In some embodiments, a positive BHS value indicates a legitimate access request while a negative BHS value indicates a fraudulent access request (e.g., based upon one or more previous rejections). A vector of BHS values can be generated for the detector 1 as a weighted sum (e.g., an aggregation) of the access result type counts 303A-303C, wherein a total of M vectors of BHS values are generated for a set of M detectors through an aggregation of the counts associated with each of the set of M detectors. In some embodiments, vector 304 of BHS values 305-308 can also be calculated by applying a function (e.g., linear or nonlinear) to each of the access result type counts prior to the aggregation.

A set of weights for a BHS calculation may be determined such that one access result may contribute more heavily to a BHS value than another access result. In most instances, the weights may be more biased towards heavily penalizing rejections, in the interest of preventing possible fraudulent activity. For example, a count of accepted access results 303A can be given a weight of 1 while a count of rejected access results 303B can be given a weight of −4.

In some embodiments, a set of weights may be determined based upon a communication channel used for initiating the access request. The communication channel may be a mobile phone, a computer, an access device connected to a building, or any suitable wireless or contactless communication interface. For example, an access request generated from a mobile phone may be given a lower weights compared to an access request generated from a point-of-sale terminal.

In some embodiments, a set of BHS vectors for each individual detector can be stored within a secondary database, referred to as the BHS storage element. The BHS storage element may also be included within the database 300. The set of BHS vectors may be mapped to the resource identifier 202, wherein the resource identifier 202 is further used to identify all of the BHS vectors associated with an access request.

C. Detector Values

In order to determine the validity of an access request, each of the vectors of BHS values (e.g., or any set of validity contributions) can be further aggregated to generate a detector value for each of the N detectors. Each of the generated detector values is used to further estimate a likelihood that the access request is valid by penalizing past access results based upon accuracy and a time period.

A detector value for the detector 1 can be calculated by taking another weighted summation of the vector 304 of BHS values 305-308. In some embodiments, the detector value can also be calculated by applying a (e.g., linear or nonlinear) function to each of the BHS values 1 to N in a BHS vector 304 prior to the weighted summation. In some embodiments, a detector value for a single detector can be defined by the below equation 1.

$$D_{Value} = \Sigma\{\Sigma(W_{ij} * C_{ij})\} \quad (1)$$

where $C_{ij}$ is a count value for a transaction result type i (e.g., a number of accepted transactions, a number of rejected transactions, etc.) for a previous week j (e.g., where a previous week 0 is equivalent to the week of the current transaction and a week 103 is equivalent to the 103th week, or 2 years, prior to the current transaction). Similarly, $W_{ij}$ is a weight value for a detector i for a previous week j.

In some embodiments, BHS values within the BHS vector 304 may be assigned weights based upon a proportion of the access result type counts. The weights may be more biased towards heavily penalizing rejections, in the interest of preventing possible fraudulent activity. For example, each rejected access result type may be given a weight of −4 while each accepted access result type may be given a weight of 1.

In some embodiments, BHS values within a vector 304 may be assigned weights $W_{ij}$ based upon a relative time period. For example, a positive BHS value 1 (e.g., indicating a valid access request) for a recent time period (e.g., the time interval 1) may be weighted less than a positive BHS value N for an earlier time period (e.g., the time interval N) as typical fraudulent access requests require a certain period of time to be processed (e.g., such as in the case of chargebacks for payment transactions). Negative BHS values (e.g., indicating a rejected access request) may conversely be weighed at a higher value for a recent time period as opposed to an earlier time period. In some embodiments, a time-based weighting can be applied to the counts of access result types when the BHS vector 304 is initially determined.

D. Evaluation Scores

The contribution values for each of the detectors implicated in an access request can be aggregated to obtain an evaluation score for the access request. Each of the detectors 1 to M can contribute in a positive or negative manner, each with varying values of contribution. In this manner, a holistic determination can be made for whether an access request is valid.

In some embodiments, the evaluation score can be determined as a summation of the detector contributions (e.g., as a sum of the vectors of BHS values).

Each of the calculated detector values can be further used to determine an evaluation score for a transaction. In some embodiments, an evaluation score is calculated for both a XM (cross resource provider) detector value a SM (single resource provider) detector value. The evaluation score can be calculated, for all detector values, using the below equation 2:

$$E_{score} = \text{NormFactor} * \Sigma(W_{ij} * D_{value}) \quad (2)$$

where a NormFactor is a normalization value that is dynamically generated based upon an elapsed period of time from a first (e.g., earliest) historical access result value associated with the current access request.

In some embodiments, a NormFactor may be defined by the below equation 3:

$$\text{NormFactor} = \frac{D_{const}}{D_{elapsed}} \quad (3)$$

where $D_{const}$ is a predetermined period of time (e.g., 728 days) and $D_{elapsed}$ is based upon the elapsed period of time since a first historical access result value associated with the current access request. For example, $D_{elapsed}$ has a value of 1 day if the current access request is not associated with any previous transaction records (e.g., in the case of a user that was not enrolled prior to the current access request). In the event that the time period over which the set of historical access result values associated with a current access request has exceeded a normalization threshold (e.g., $D_{elapsed}$ is either a larger value or equivalent value compared to $D_{const}$), the NormFactor is automatically set to a constant value of 1.

E. Distributions of Evaluations Scores and Classifications

The evaluation score can be compared to a corresponding distribution in order to generate an info code based upon the classification of the evaluation score as either positive (e.g., a valid access request) or negative (e.g., a fraudulent access request). The info code uses the evaluation score and its corresponding prediction of the legitimacy of an access request in order to further categorize the access request (e.g., as highly positive, likely positive, likely negative, highly negative, or no history).

An access request may be classified as "highly positive" as opposed to "likely positive" based upon the value of the evaluation score. For example, a large evaluation score (e.g., such as 4000) may be classified as "highly positive" while a smaller evaluation score (e.g., such as 10) may only be classified as "likely positive".

Furthermore, in some embodiments, an access request may be given a classification of "no history" in the event that there is an insufficient amount of historical access result data for making an informed determination. In some embodiments, an access request may also be classified as "no history" if an evaluation score is 0.

1. Single Resource/Request Computers

In some embodiments of the disclosure, a frequency distribution curve is generated based upon the evaluation scores for all access requests for a protected resource that have been analyzed over the course of a time period (e.g., 6 months). Thus, the frequency distribution can be generated using historical evaluation scores determined from the historical access result values. The frequency distribution curve may include all of the past transaction scores associated with the protected resource or a resource provider (e.g., a request computer or a resource computer) that provides the protected resource.

In some embodiments, the distribution may include a "grey zone", wherein a determination of the authenticity of an access request cannot be made. In response, a resource or request computer may prompt a user to provide additional authentication information or additional historical access result information. In some embodiments, if an access request is determined to fall within the "grey zone", the access request is rejected.

2. Cross Resource/Request Computers

In some embodiments of the disclosure, a frequency distribution curve is additionally generated based upon the transaction scores for an entirety of access requests analyzed by an access server over the course of a time period. The frequency distribution curve may include information across a wide range of resource providers (e.g., multiple merchants), wherein each of the resource providers within the range of resource providers may not necessarily be associated with each other or provide similar resources.

In some embodiments, a first classification may be generated based upon a single provider distribution and a second classification may be generated based upon a cross provider distribution for an access request. In some instances, the first classification may be different from the second classification, such that for example, an access request may be given a positive classification for the first classification and a negative classification for the second classification. A set of access rules may determine that only a first classification must be positive in order to approve an access request. Another set of access rules may determine that both a first and second classification must be positive in order to approve an access request.

V. Classifications of New Access Requests (Info Codes)

Embodiments of the disclosure can use the above-defined historical tracking and time-based data structures to generate classifications of incoming access requests (also referred to as info codes). The generation and utilization of info codes is discussed below.

A. Identification of Detectors and Detector Values for Access Request

After determining the enrollment of a user within the authentication system, a record profile for the user can be retrieved for a new access request. The record profile may be a data structure of bound data elements from at least one or more past access requests collected over a period of time. The data structure can have connections that link the data elements together, where a connection can indicate that the linked data elements were present in a same access request. The connections can be defined as pointers from one data element (or node) to another or as a system of mapping the linked data elements to an access request identifier. In doing so, a recurrence (or pattern) of data elements can become more apparent, enabling the access server to easily identify the typical data elements associated with access requests of the user.

For a new access request, a data structure associated with a resource identifier of the new access request can be identified. A set of data elements for each of the past access requests stored within the identified data structure can be obtained, where the set of data elements corresponds to at least the set of data elements comprising the new access request. For example, an access request that includes a user email requires that at least the user email for each of the corresponding past access requests stored within the data structure can be extracted.

Each of the obtained data elements can then be sent to a corresponding detector. In some embodiments, two or more of the obtained data elements can be sent to a corresponding detector.

B. Retrieval of Data Structures for Access Request

In order to ensure the retrieval of a correct data structure for a given access request, a data structure may be mapped to a resource identifier (e.g., an account number or a personal identification number). The resource identifier can be included within the data elements comprising the given access request. As such, an access server can easily find the corresponding data structure for an incoming access request based upon the resource identifier.

Similarly, in some embodiments, a BHS value stored within either a secondary database or another data structure may also be associated with the resource identifier. The uniform use of the resource identifier in identifying a data structure or BHS values associated with the access request enables the simple and efficient retrieval of relevant data for processing new access requests.

C. Determining Classification

Upon retrieval, the collection of data elements and validity contribution values can be used to generate a numerical prediction (e.g., or probability value) that determines the likelihood of an access request being valid or not. The numerical prediction is typically referred to as an evaluation score. The evaluation score may be compared to values within a distribution in order to determine a classification (e.g., info code) for the access request.

As examples, the distribution used for determining the classification may be a single provider distribution or a cross provider distribution. In one example, a first classification may be generated based upon a single provider distribution and a second classification may be generated based upon a cross provider distribution. In another example, an access rule may specify a desired distribution for generating the classification. For instance, a resource provider may have an access rule that includes a condition that a classification be determined based upon a single provider distribution, wherein the single provider distribution is generated from the resource provider's past access results.

In some embodiments, a threshold may be defined based upon the distribution. For a positive evaluation score, a determination of the info code (e.g., either highly positive or likely positive) can be based upon the threshold. Similarly, in the event of a negative evaluation score, the determination of the info code (e.g., either highly negative or likely negative) can also be based upon the threshold. In some embodiments, the info code may be defined as "no history" in the event that an access request lacks enough historical access request data (e.g., generally, at the time of enrollment) in order to make a determination of the legitimacy of the access request.

Figure 4:
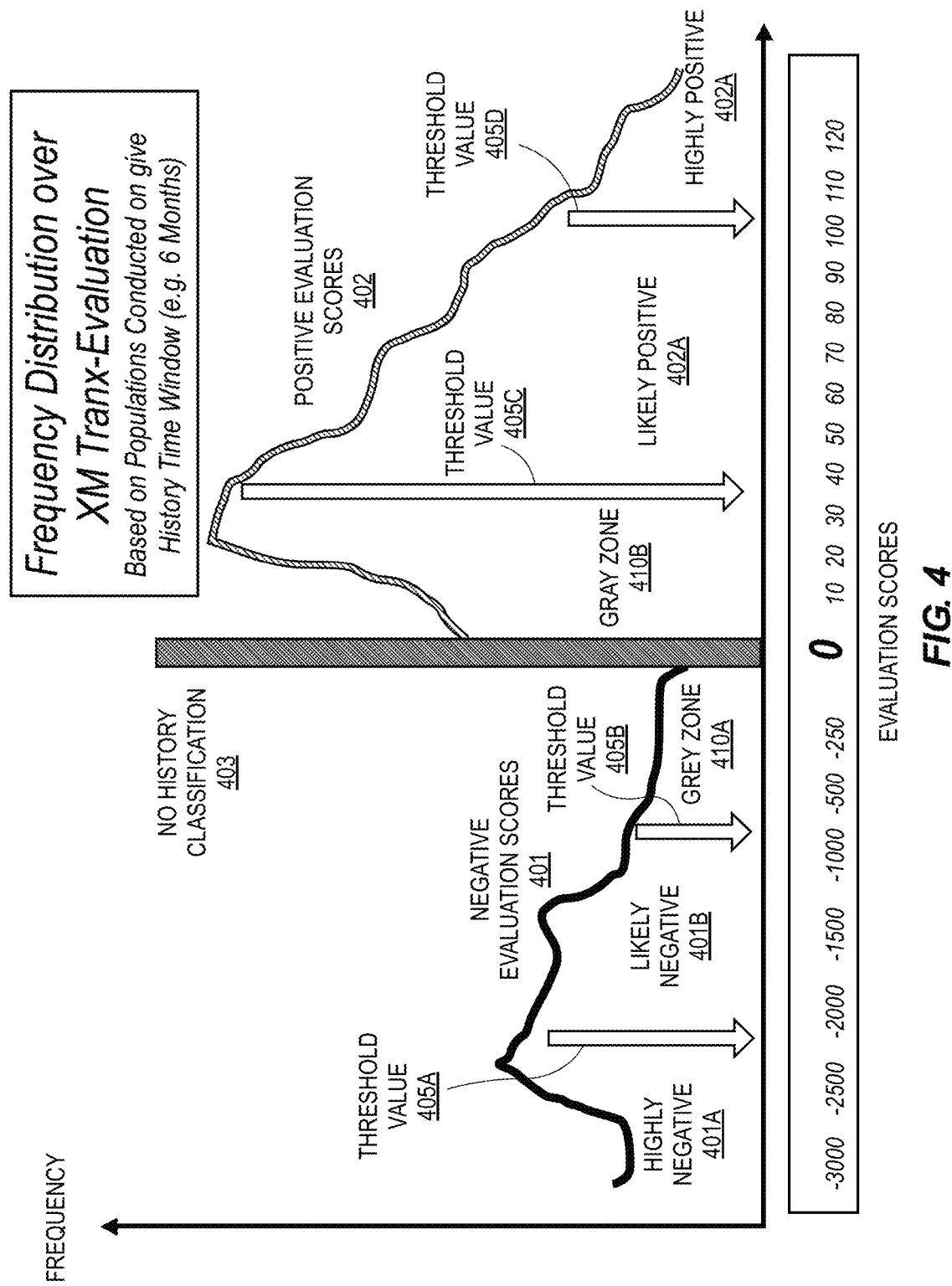
FIG. 4 shows an exemplary cross-resource frequency distribution for determining classifications of an access result, in accordance with some embodiments of the present invention.

FIG. 4 depicts an exemplary cross resource distribution taken over a 6 month time period that maps evaluation scores to a set of frequencies of an access request being valid based on data taken from past access results across multiple resource providers. According to FIG. 4, a set of negative evaluation scores 401 can be categorized into either a highly negative classification 401A or a likely negative classification 401B, wherein the highly negative classification 401A indicates a greater magnitude for the likelihood that the access request is not valid compared to the likely negative classification 401B. A set of positive evaluation scores 402 can be categorized into either a likely positive classification 402A or a highly positive classification 402B, wherein the highly positive classification 402B indicates a greater magnitude for the likelihood that the access request is valid compared to the likely positive classification 402A.

A set of threshold values can be defined for each possible classification, where the set of threshold values are directly correlated to the distribution. A threshold value 405A can be defined such that an evaluation score below the threshold value 405A (e.g., in this case, approximately −2000) is given the highly negative classification 401A, while an evaluation score above the threshold value 405A (e.g., but below a next threshold value 405B) is given the likely negative classification 401B. Another threshold value 405B is defined such that an evaluation score below the threshold value 405B is given the likely negative classification 401B.

For the positive evaluation scores 402, a threshold value 405C and a threshold value 405D are defined such that an evaluation score between the threshold value 405C and the threshold value 405D is given a likely positive classification 402A. An evaluation score that exceeds the threshold value 405D is given a highly positive classification 402B.

In some embodiments, distributions also include a grey zone 410A and a grey zone 410B, wherein the distribution cannot accurately make a positive or negative determination for an evaluation score. With reference to FIG. 4, an evaluation score between the threshold value 405B and the threshold value 405C is located within either the grey zone 410A or the grey zone 410B, such that the evaluation score is given a no history classification 403. The no history classification 403 is used when an access request is not associated with a sufficient amount of historical access result data in order to make a prediction of the access request validity. In response to receiving the no history classification 403, a user may be prompted to provide additional authentication information.

D. Uses of Classifications

A resource provider can use the info code in defining at least one or more access rules. For example, a resource provider may define an access rule such that any access request that is given a "highly negative" classification is automatically rejected. As another example, a resource provider may define an access rule such that an access request for a high-risk resource (e.g., for a high-security building or an expensive product) is only accepted if the classification for the access request is determined as "highly positive" in order to ensure the security of the high-risk resource.

Furthermore, more than one distribution may be used in some embodiments, such that more than one info code may be generated. Therefore, a resource provider may include at least one or more access rules in order to determine which info code(s) must be positive in order to approve an access request. For example, a resource provider may define an access rule such that an access request is approved only if all of the generated info codes are "highly positive" or "likely positive".

VI. Access Server System

Figure 5:
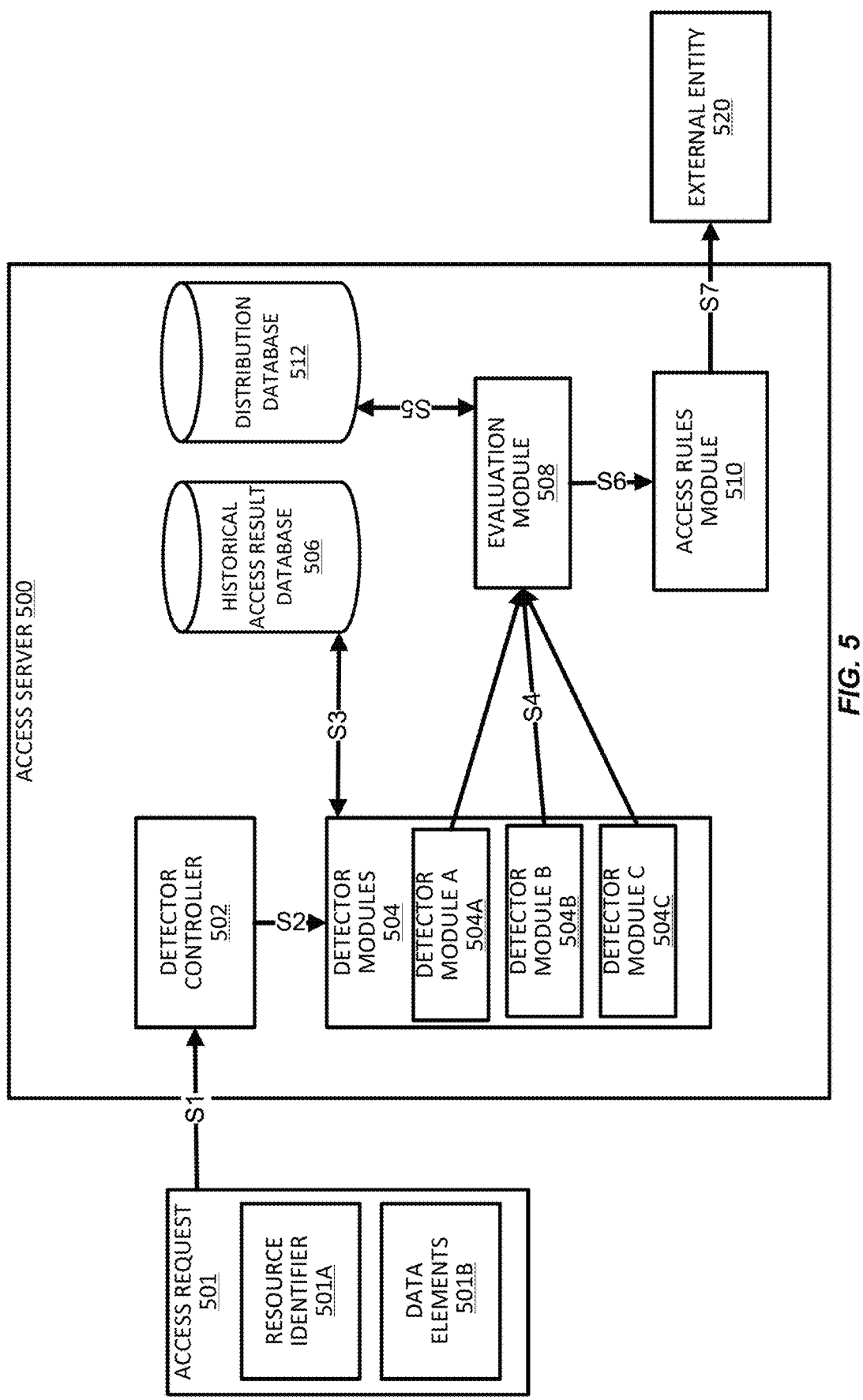
FIG. 5 shows a block diagram of an access server according to embodiments of the present invention.

FIG. 5 depicts an access server 500 according to embodiments of the disclosure. The access server 500 may include a processor coupled to a non-transitory computer readable medium and a network interface for receiving and transmitting messages (e.g. access requests and access results) to other entities (e.g., a client device operated by a user, an access device operated by a resource provider, a request computer, etc.).

The processor may include one or more microprocessors to execute program components for performing the functions of the non-transitory computer readable medium, such as generation, management, and usage of data structures for determining whether to grant access to a protected resource.

The non-transitory computer readable medium may store code executable by the processor for implementing functions described herein. For example, the non-transitory computer readable medium may include a detector controller 502, a set of detector modules 504, an evaluation module 508, and an access rules module 510. The detector controller 502 can manage the identification and transmittal of data elements to the set of detector modules 504. The set of detector modules 504 can use a corresponding set of data elements to calculate a set of validity contribution values. The evaluation module 508 can receive a set of validity contribution values in order to generate a classification for an access request. The access rules module 510 may use the classification in order to determine an access result.

The access server 500 may further include a historical access result database 506 for the storage of data structures comprising historical access result data, wherein the historical access result database 506 may further comprise a routing table, wherein each of the stored data structures are mapped to a resource identifier 501A. In addition, the access server 500 may include a distribution database 512 for the storage of frequency distribution values of past access requests.

Referring back to FIG. 5, in step S1, the access server may receive an access request 501 from a request computer. The access request 501 may comprise a resource identifier 501A and a set of data elements 501B. The access request 501 may be transmitted to a detector controller 502.

In step S2, the detector controller 502 can extract the set of data elements 501B from the access request 501. The detector controller 502 can identify a subset of detector modules that can be associated with each of the extracted set of data elements 501B. Access rule module 510 may communicate with detector controller 502 to identify a set of detector identifiers that specify a subset of the set of detector modules 504 that should be used in the evaluation of the access request 501. In another implementation, the access request 501 may contain a set of detector identifiers that correspond to a subset of the set of detector modules 504, where the set of detector identifiers can be determined by a resource provider.

In step S3, each of the subset of detector modules 504 may retrieve historical access result data using the resource identifier 501A included within the access request 501 to locate a data structure (e.g., corresponding to the access request 501) within the routing table of the historical access result database 506. The data structure can contain historical access result data for the set of data elements 501B. Each of the retrieved historical access result data may be located within the data structure by a data element identifier, and stored within a vector. If no data structure corresponding to the resource identifier 501A can be found within the historical access result database 506, a request may be transmitted to a generation module (not pictured in figure) to create a new data structure based upon the set of data elements 501B.

In step S4, each of the subset of detector modules 504 may aggregate its corresponding vector to generate a detector value. Each of the subset of detector modules transmits the generated detector value to the evaluation module 508. Each of the generated detector values may include the resource identifier 501A, so that the evaluation module 508 can determine that the detector values are all associated with the access request 501.

In step S5, the evaluation module 508 further aggregates the set of detector values in order to generate an evaluation score. A positive evaluation score indicates that the access request 501 is valid, while a negative evaluation score indicates that the access request 501 is suspicious. The evaluation module 508 determines a classification for the access request 501 based upon a comparison of the evaluation score and a distribution(s) of past evaluation scores. The distribution(s) of past evaluation scores may be accessed from a distribution database 512. In some embodiments, a first distribution associated with only the resource provider may be accessed from the distribution database 512 in order to determine the classification. A second distribution associated with all past access results may also be accessed from the distribution database 512 to determine another classification.

In step S6, the evaluation module 508 transmits the determined classification(s) to the access rules module 510, which can comprise a set of conditions for authorizing an access request. The set of conditions may be manually determined by the resource provider. In embodiments of the disclosure, at least one of the set of conditions may use at least one determined classification in order to authorize the access request 501. In some embodiments, the access rules module 510 may communicate with an external entity 520 (e.g., an issuer or an acquirer in the case of a payment transaction) to determine if the access request 501 should be authorized.

In step S7, the access rules module 510 determines that access to a protected resource should (e.g. or should not) be granted based upon the set of conditions. In some embodiments, at least a predefined number of conditions are to be satisfied in order to grant access to the resource. The predefined number can be all of the set of conditions are to be satisfied in order to grant access to the resource. In response to the determination by the access rules module 510, an access result is generated, wherein the access result indicates whether access to the resource has been granted. The access result is transmitted to a resource computer, wherein the resource computer determines whether or not to provide access to the resource based upon the access result.

VII. Method

Figure 6:
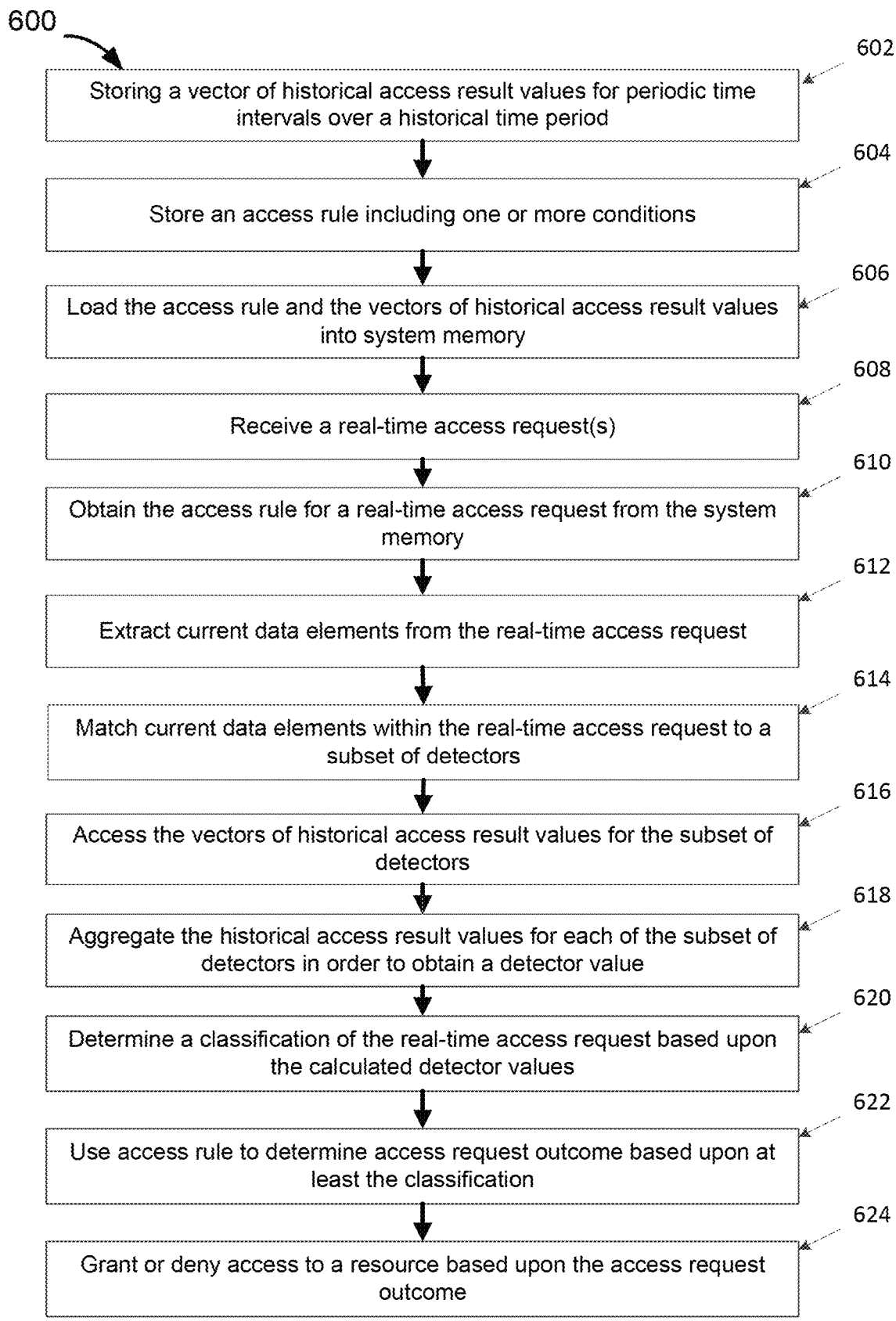
FIG. 6 shows a flowchart for utilizing historical access result data in the authorization of an access request according to embodiments of the present invention.

FIG. 6 depicts a flow chart of a method 600 for securing access to resources in accordance with an embodiment of the disclosure. The method may be performed by a computer system, such as an access server of the resource security system that controls access to a resource. The access server can authenticate incoming access requests in real-time.

In step 602, a vector of historical access result values are stored within a database for a plurality of detectors, wherein vector of historical access result values may indicate past approved or rejected access requests over a historical time period. Each of the plurality of detectors may be associated with one of the data elements. The one or more data elements can include an account number, a user email address, an IP address, etc. In some instances, a subset of the plurality of detectors may be associated with a combination of data elements.

In step 604, an access rule may be stored, wherein the access rule comprises a set of conditions. At least one of the set of conditions may comprise using the vector of historical access result values in order to determine the legitimacy of an access request, e.g., a classification using an evaluation score as described above. Another example of the set of conditions can be determining the legitimacy of an access request based upon a time and/or a location of the access request. The set of conditions may be determined by a resource provider or an external entity. The set of conditions can also be determined by a level of desired protection for a resource. Access rules for high-risk or high-security resources (e.g., such as payment transactions) may include a greater number of conditions as opposed to access rules for low-risk resources.

In step 606, the access rule and a vector of historical access result values may be loaded into a system memory. The vector of historical access result values may be stored within a historical access result database within the access server, while the access rule may be stored within an access rules module within the access server.

In step 608, a new access request is received at a resource computer for accessing a protected resource. The new access request may include a resource identifier and one or more data elements. The new access request may be received by any one of a variety of devices (e.g., a user device, an access device, or a request computer). The desired resource can include access to a secure location or building, a good, a service, etc.

In step 610, the access rule is obtained from the system memory upon receiving the new access request. In some embodiments, the access rule can be associated with a provider identifier, wherein the provider identifier is associated with a resource provider and used to identify a correct access rule for securing access to a resource from the resource provider. Therefore, different access rules (e.g., with different sets of conditions) may be used for different resource providers.

In step 612, the one or more data elements comprising the new access request are extracted from the new access request. The extracted one or more data elements may include a data element identifier, wherein the data element identifier can identify a type of data element. The extracted one or more data elements may be transmitted to a set of detectors.

In step 614, the extracted one or more data elements are matched to a subset of detectors from the set of detectors. The matching of a data element to a single detector may be facilitated through the use of the data element identifiers, wherein the single detector associated with a corresponding data element(s) contains the data element identifier(s) for the corresponding data element(s). In some embodiments, the subset of detectors may include all of the detectors. The subset of detectors may include a set of detectors that are directed to the analysis of an individual data element and another set of detectors that are directed to the analysis of a combination of two or more data elements. A detector of the subset of detectors can be matched to the plurality of current data elements using a combination of at least two data elements of the plurality of current data elements.

In step 616, a data structure associated with a current access request is accessed in order to retrieve vectors of historical access result data. The data structure may be stored in a computer-readable medium that is accessible by the access server. The data structure may be stored in any suitable manner, e.g., as an array, a linked list, a graph database, or as a table in a database. The data structure may be associated with a resource identifier and one or more existing data elements that were obtained from previous access requests. The resource identifier may correspond to the particular table in the database, and may be used as a primary key in a query that accesses the database to obtain the data structure associated with the resource identifier of the current access request.

Historical access result data may be retrieved from the data structure for each of the subset of detectors used for the current access request. Historical access result data may include a history of outcomes (e.g., accepted or rejected) for past access requests and a plurality of data elements. In some embodiments, the one or more data elements associated with the current access request may not be the same or only a subset of the plurality of data elements within the historical access result data. Furthermore, the historical access result data may be stored within a vector or in any other suitable manner.

In step 618, the vector(s) of historical access result data associated with a data element or combination of data elements is used to calculate a detector value. The detector value provides a measure of the percentage of past historical access requests associated with a corresponding data element(s) that have been approved. In some embodiments, detector values for each of the subset of detectors may be further processed to generate an evaluation score that provides a measure of the percentage of approved past access requests for all of the data elements associated with the access request.

In step 620, the set of detector values or the evaluation score based upon the set of detector value is used to determine a classification for the access request. In some embodiments, the classification may include a measure of a range (e.g., likely, unlikely, highly likely, etc.) of acceptances or rejections, wherein the range that an access request falls within is determined by comparing an evaluation score to a predetermined set of thresholds. The classification may be further determined by evaluating the set of detector values or the evaluation score based upon a distribution. In some embodiments, an exemplary distribution may generate a classification based upon the historical access result data across a set of resource providers.

In step 622, the access server uses a set of access rules in order to make a final determination of the validity of the new access request. At least one of the set of access rules includes the use of the determined classification in deciding whether or not an access request should be accepted or denied. In some embodiments, remaining access rules may comprise making a determination based upon the amount of one or more data elements associated with a current access request that match the one or more data elements associated with historical access result data, a user having insufficient funds, etc. In some embodiments, all of the set of access rules must make a positive determination in order to approve an access request. In other embodiments, a predetermined amount of the set of access rules must make a positive determination in order to approve an access request.

In step 624, the determination of an access result based upon the set of access rules is transmitted to a request computer. Upon the determination of a positive access result, the user is granted access to the desired resource. In some embodiments, an access result may not be able to be determined (e.g., due to insufficient historical access result data) such that further authentication data may be required from the user.

VIII. Example Computer System

Figure 7:
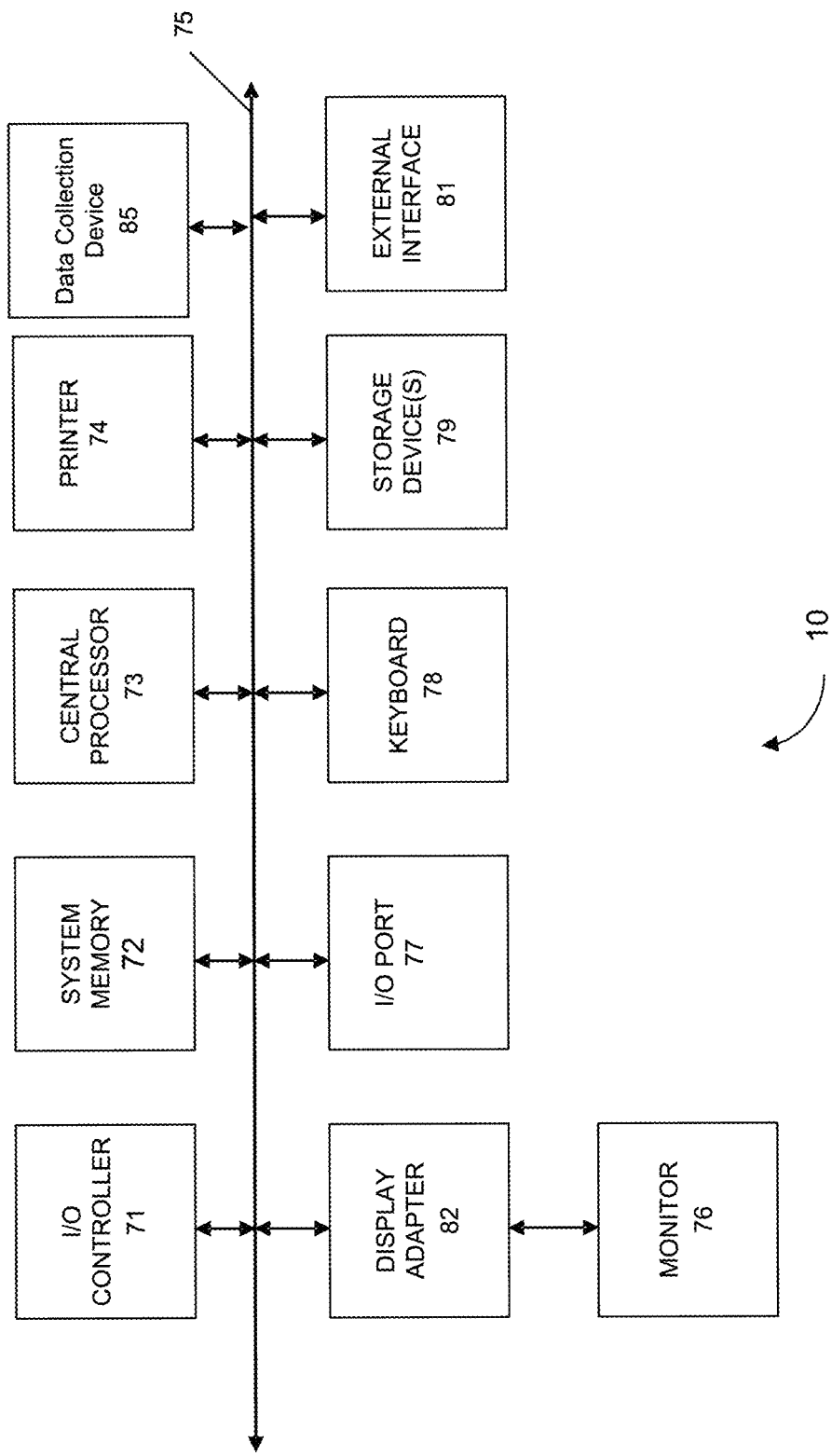
FIG. 7 shows a block diagram of an exemplary computer apparatus, in accordance with some embodiments of the present invention.

Any of the computer systems mentioned herein may utilize any suitable number of subsystems. Examples of such subsystems are shown in FIG. 7 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 7 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method for securing access to a resource in a transaction, the method comprising performing, by a computer system:
   for each of a plurality of detector values configured to determine a validity of one or more data elements of each of a set of detectors, storing a vector of historical access result values corresponding to periodic time intervals within a historical time period,
   wherein each detector of the set of detectors includes the one or more data elements used in historical access requests to a set of one or more resources including the resource,
   wherein the historical access result values provide a measure of approval in granting access to historical access requests for a corresponding detector during a time interval;
   storing an access rule including one or more conditions;
   loading, into a system memory, the access rule and the vectors of historical access result values of the plurality of detector values of each of the set of detectors;
   receiving, over a network from a plurality of devices, a plurality of real-time access requests;
   accessing the system memory to obtain the access rule when a real-time access request of the plurality of real-time access requests is received from a first device of the plurality of devices, the real-time access request comprising a resource identifier that identifies the resource and a plurality of current data elements corresponding to at least a portion of the set of detectors;
   extracting the plurality of current data elements from the real-time access request;
   matching the plurality of current data elements to the at least a portion of the set of detectors to form a subset of detectors;
   accessing the vectors of historical access result values for the subset of detectors;
   for each of the subset of detectors, aggregating the historical access result values to obtain a detector value providing the measure of approval in granting access to the historical access requests for the detector;
   generating a classification of the real-time access request using the detector values of the subset of detectors;
   using the access rule to determine an access request outcome for the real-time access request, the one or more conditions of the access rule including the classification; and
   providing access to the resource based on the access request outcome.

2. The method of claim 1, wherein the resource is access to a secure location or building.

3. The method of claim 1, wherein the resource is a physical object provided to a user.

4. The method of claim 1, wherein the plurality of current data elements include a user name, an account number, a token, a password, a personal identification number, a signature, a digital certificate, an email address, a phone number, a physical address, and a network address.

5. The method of claim 1, wherein the vectors of historical access result values are stored within a data structure.

6. The method of claim 5, wherein the data structure that stores the vectors of historical access result values associated with the real-time access request is identified by the resource identifier.

7. The method of claim 1, wherein generating the classification comprises:
- generating a frequency distribution of historical evaluation scores determined from the historical access result values;
- determining an evaluation score using the detector values of the subset of detectors; and
- generating the classification of the real-time access request based on the evaluation score and the frequency distribution.

8. The method of claim 7, wherein the classification of an access request is based upon a set of threshold values derived from the frequency distribution.

9. The method of claim 1, wherein a detector of the subset of detectors is matched to the plurality of current data elements using a combination of at least two data elements of the plurality of current data elements.

10. The method of claim 1, wherein the set of one or more resources is a plurality of resources, and wherein the historical access requests are received for a plurality of users.

11. A computer system for securing access to a resource in a transaction, the computer system comprising:
- one or more processors;
- a non-transitory computer readable medium storing a plurality of instructions that, when executed, control the one or more processors to perform:
  - for each of a plurality of detector values configured to determine a validity of one or more data elements of each of a set of detectors, storing a vector of historical access result values corresponding to periodic time intervals within a historical time period,
  - wherein each detector of the set of detectors includes the one or more data elements used in historical access requests to a set of one or more resources including the resource,
  - wherein the historical access result values provide a measure of approval in granting access to historical access requests for a corresponding detector during a time interval;
  - storing an access rule including one or more conditions;
  - loading, into a system memory, the access rule and the vectors of historical access result values of the plurality of detector values of each of the set of detectors;
  - receiving, over a network from a plurality of devices, a plurality of real-time access requests;
  - accessing the system memory to obtain the access rule when a real-time access request of the plurality of real-time access requests is received from a first device of the plurality of devices, the real-time access request comprising a resource identifier that identifies the resource and a plurality of current data elements corresponding to at least a portion of the set of detectors;
  - extracting the plurality of current data elements from the real-time access request;
  - matching the plurality of current data elements to the at least a portion of the set of detectors to form a subset of detectors;
  - accessing the vectors of historical access result values for the subset of detectors;
  - for each of the subset of detectors, aggregating the historical access result values to obtain a detector value providing the measure of approval in granting access to the historical access requests for the detector;
  - generating a classification of the real-time access request using the detector values of the subset of detectors;
  - using the access rule to determine an access request outcome for the real-time access request, the one or more conditions of the access rule including the classification; and
  - providing access to the resource based on the access request outcome.

12. The computer system of claim 11, wherein the resource is access to a secure location or building.

13. The computer system of claim 11, wherein the resource is a physical object provided to a user.

14. The computer system of claim 11, wherein the plurality of current data elements include a user name, an account number, a token, a password, a personal identification number, a signature, a digital certificate, an email address, a phone number, a physical address, and a network address.

15. The computer system of claim 11, wherein the vectors of historical access result values are stored within a data structure.

16. The computer system of claim 15, wherein the data structure that stores the vectors of historical access result values associated with the real-time access request is identified by the resource identifier.

17. The computer system of claim 11, wherein generating the classification comprises:
- generating a frequency distribution of historical evaluation scores determined from the historical access result values;
- determining an evaluation score using the detector values of the subset of detectors; and
- generating the classification of the real-time access request based upon the evaluation score and the frequency distribution.

18. The computer system of claim 17, wherein the classification of an access request is based upon a set of threshold values derived from the frequency distribution.

19. The computer system of claim 11, wherein a detector of the subset of detectors is matched to the plurality of current data elements using a combination of at least two data elements of the plurality of current data elements.

20. The method according to claim 1, wherein the detector is configured to extract from an access request one or more data elements assigned to the detector.

* * * * *